United States Patent
Wiklund et al.

[19]

[11] Patent Number: 5,953,490
[45] Date of Patent: Sep. 14, 1999

[54] CIRCUIT FOR SPEED CONTROL FOR A ONE-PHASE OR THREE-PHASE MOTOR

[75] Inventors: Gunnar Wiklund, Kristinehamn; Håkan Öhrnell, Karlstad, both of Sweden

[73] Assignee: Wöel Elektronik HB, Karlstad, Sweden

[21] Appl. No.: 08/591,631

[22] PCT Filed: Aug. 19, 1994

[86] PCT No.: PCT/SE94/00753

§ 371 Date: Apr. 1, 1996

§ 102(e) Date: Apr. 1, 1996

[87] PCT Pub. No.: WO95/06353

PCT Pub. Date: Mar. 2, 1995

[30] Foreign Application Priority Data

Aug. 20, 1993 [SE] Sweden ................................. 9302692

[51] Int. Cl.⁶ ................................................. H02P 5/28
[52] U.S. Cl. ..................... 388/811; 318/254; 318/439; 318/138; 318/799; 318/811
[58] Field of Search ................................. 388/804, 811, 388/819, 907.2, 918; 318/254, 439, 138, 799, 811

[56] References Cited

U.S. PATENT DOCUMENTS

| | | | |
|---|---|---|---|
| 4,078,393 | 3/1978 | Wills | 62/184 |
| 4,360,808 | 11/1982 | Smith, III et al. | 340/825.69 |
| 4,866,357 | 9/1989 | Miller et al. | 318/443 |
| 5,534,763 | 7/1996 | Williams et al. | 318/799 |

FOREIGN PATENT DOCUMENTS

| | | |
|---|---|---|
| 0 155 218 B1 | 9/1985 | European Pat. Off. . |
| 27 00 296 A1 | 7/1977 | Germany . |
| 34 09 299 C2 | 5/1986 | Germany . |
| 1022199 | 3/1966 | United Kingdom . |
| WO 85/04292 | 9/1985 | WIPO . |

OTHER PUBLICATIONS

Murphy, J.M.D. Thyristor Control of A.C. Motors *Pergamon Press* 154–158 (1973).

ELFA–katalog nr 39, ELFA AB 1990, ISSN 91–88032–01–0 sid 1077, PVI 5100, "Optokopplare med isolerad utspänning".

Patent abstracts of Japan, vol. 11, No. 81, E–488, abstract of JP, A, 61–234620 (Nissin Electric Co Ltd et al), Oct. 18, 1986.

*Primary Examiner*—William M. Shoop, Jr.
*Assistant Examiner*—Kim Lockett
*Attorney, Agent, or Firm*—Foley, Hoag & Eliot LLP

[57] ABSTRACT

The circuit for speed regulation of a three-phase motor incorporates a drive connected directly to a three-phase mains (R,S,T) which allows through mains voltage directly to the motor windings controlled by a pulse-width modulated signal produced by a control circuit controlled by the motor speed and fed to the drive stage via circuits for galvanic (d.c.) separation of the control circuit and the drive stage. The galvanic separation is produced with solar cell components.

44 Claims, 8 Drawing Sheets

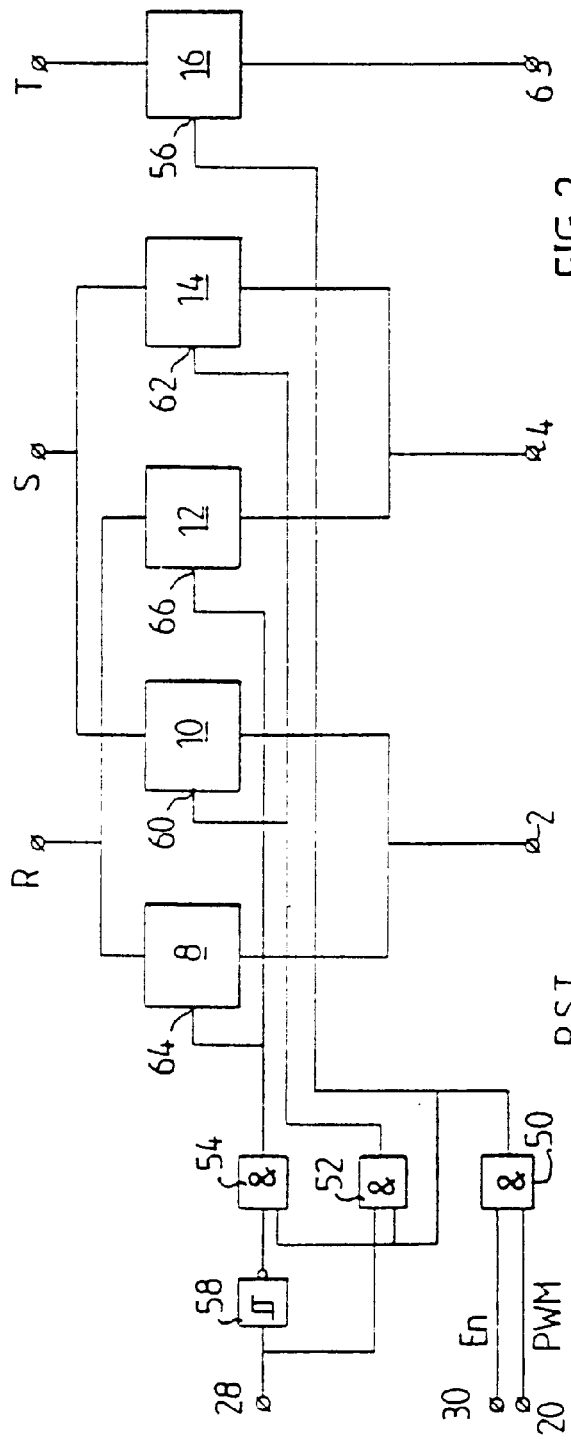
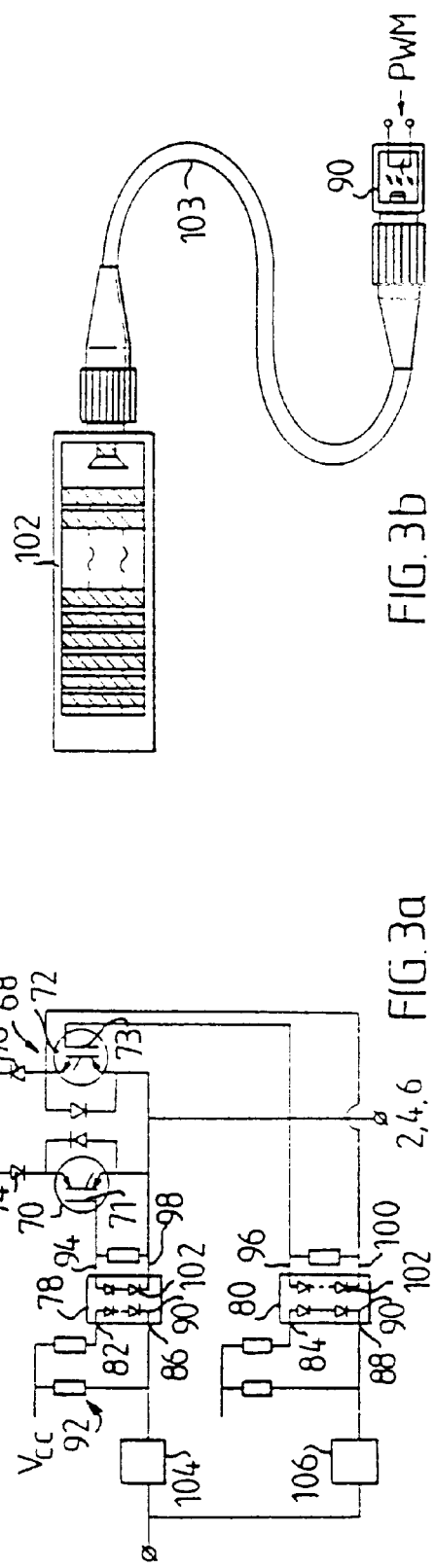
FIG.2
FIG.3b
FIG.3a

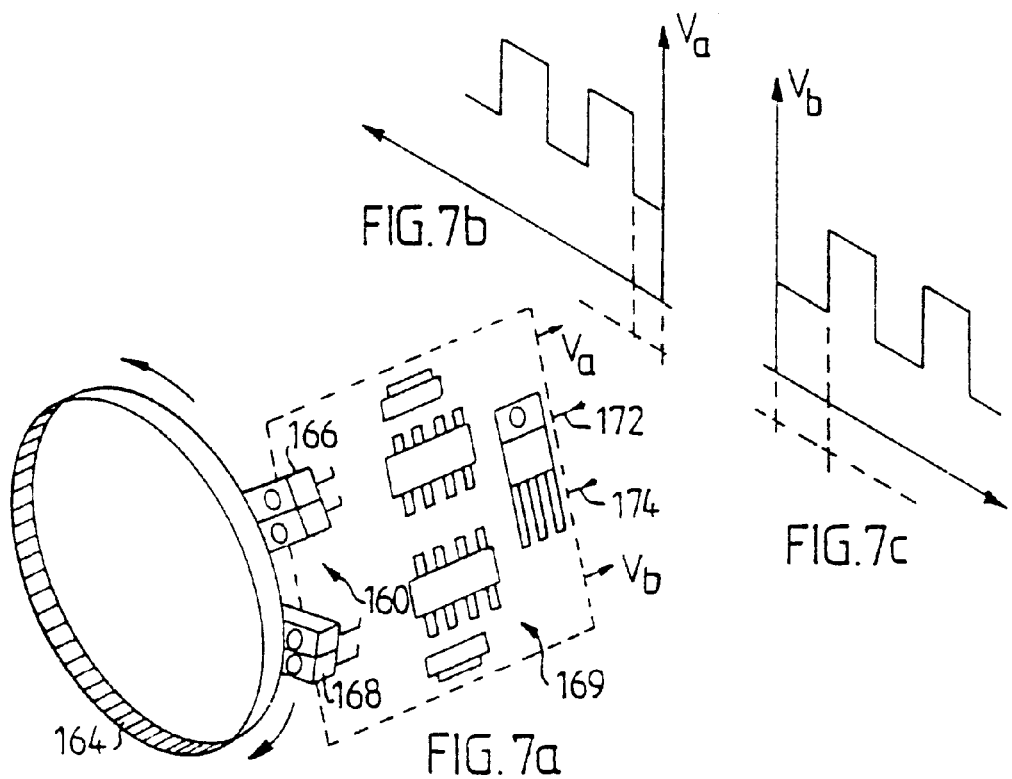
FIG.7b
FIG.7c
FIG.7a
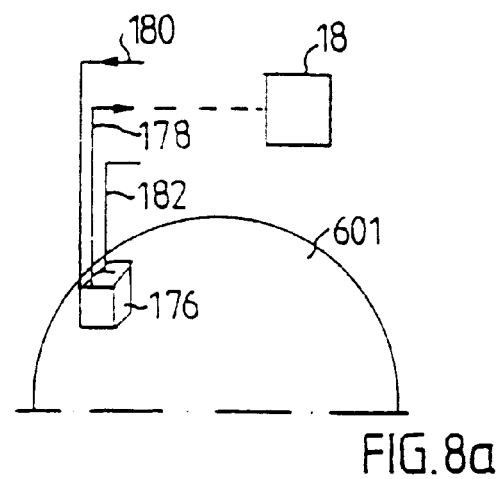
FIG.8a
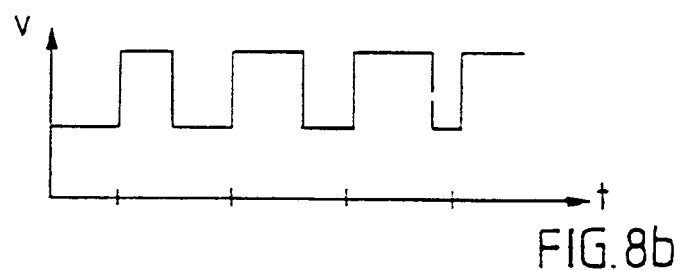
FIG.8b

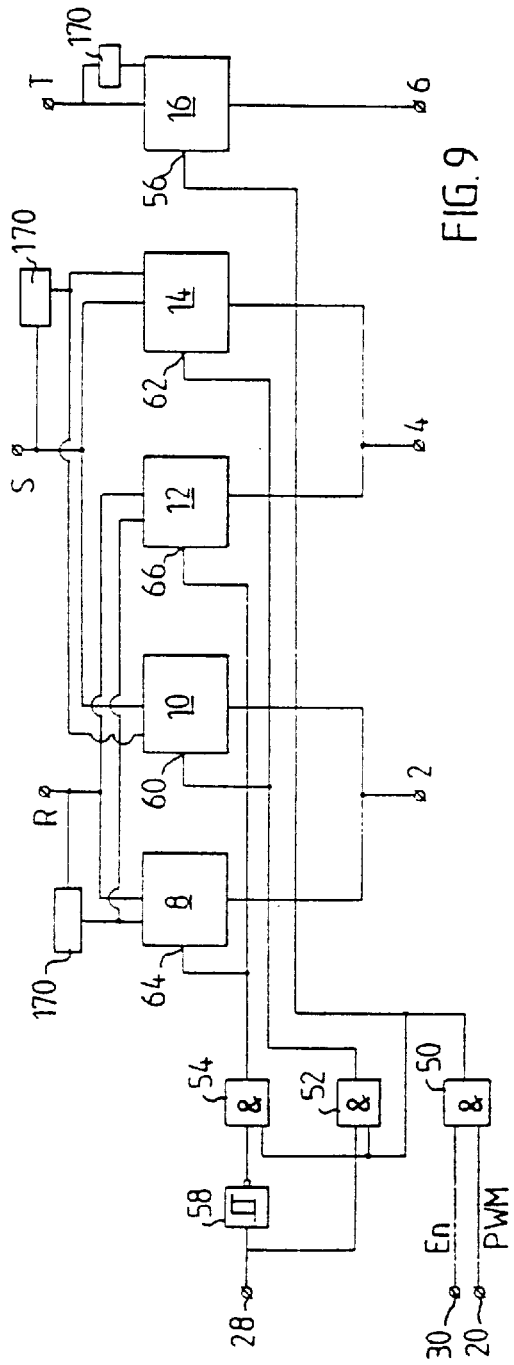
FIG. 9
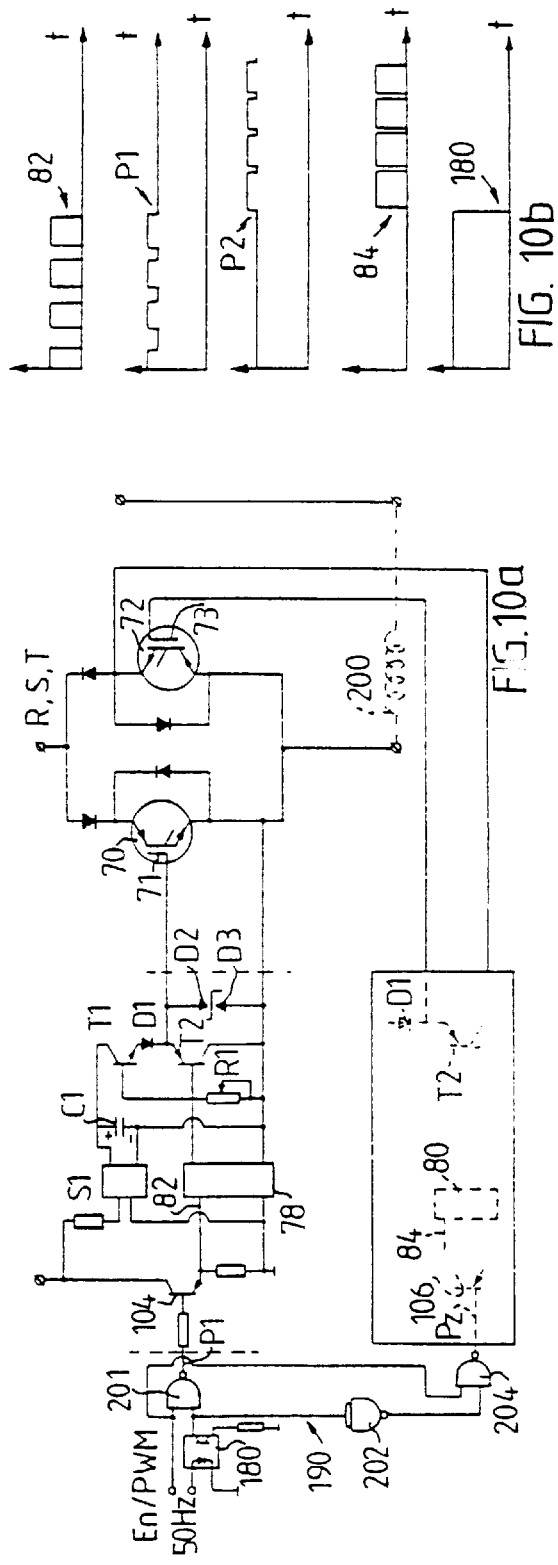
FIG. 10b
FIG. 10a

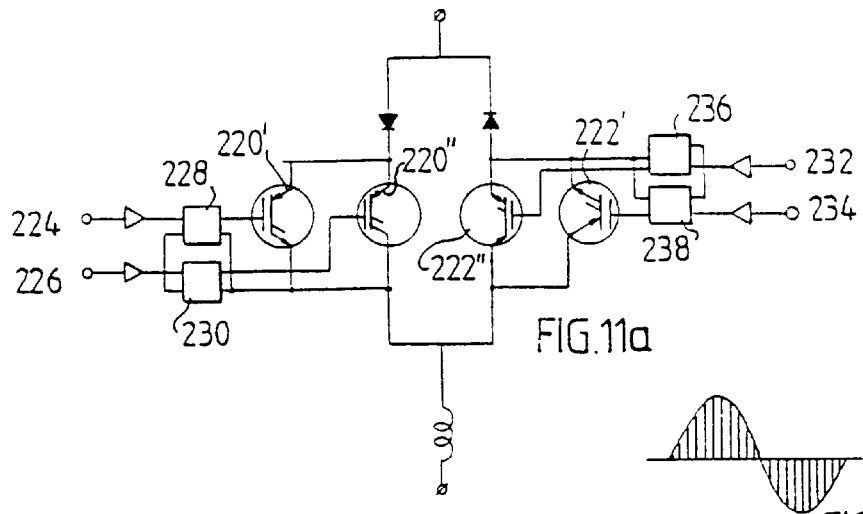
FIG. 11a
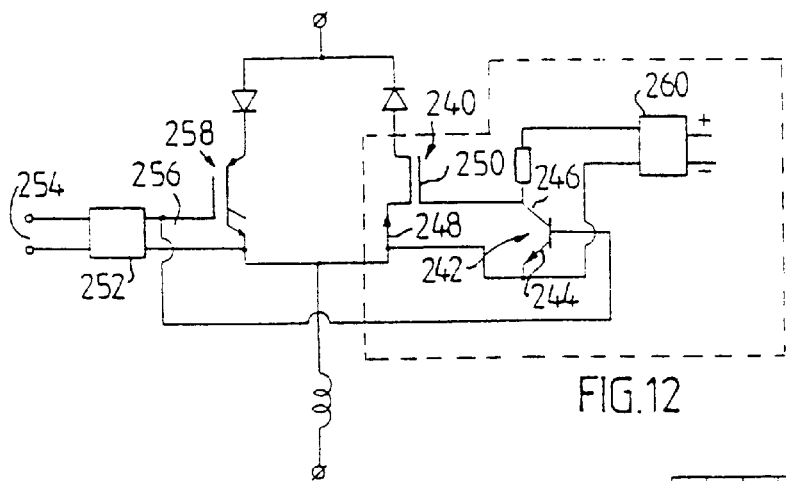
FIG. 11b
FIG. 12
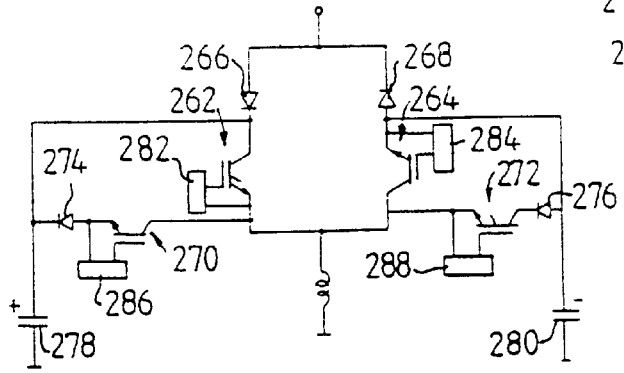
FIG. 13a
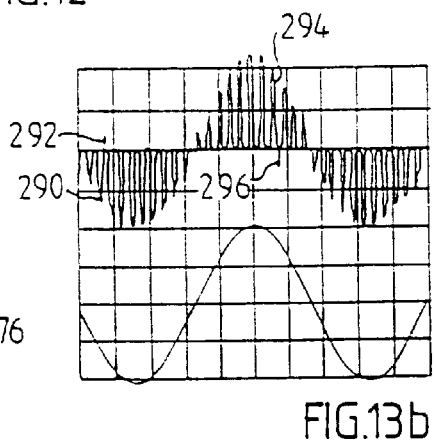
FIG. 13b
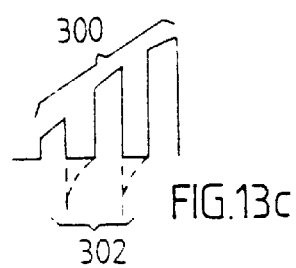
FIG. 13c

CIRCUIT FOR SPEED CONTROL FOR A ONE-PHASE OR THREE-PHASE MOTOR

TECHNICAL FIELD

The present invention relates according to one aspect to a circuit for controlling the speed of a one-phase or three-phase motor, according to another aspect to a switching circuit for a.c. voltage, according to a further aspect to a circuit for controlling the speed of a three-phase motor which drives a compressor in a refrigerating machine, and according to still a further aspect to apparatuses for detecting the speed and direction of rotation of a rotating shaft.

BACKGROUND OF THE INVENTION

It is known from DE 3 409 299 to control the speed of a three-phase motor by pulse width modulating the mains voltage via transistor driving stages which are controlled by a control circuit which is galvanically separated from the driving stages. The driving stages are adapted for reversing the phase to change the direction of rotation.

"Thyristor Control of A. C. Motors", JMD Murphy, Pergamon Press, 1973, chapter 9.3, pages 154–158, shows an example of a voltage controlled speed control of a three-phase induction motor. The control is carried out by feedback of the actual speed which is compared with a set value according to FIG. 9.6. FIG. 9.5 shows a circuit for phase reversal.

From DE 2 700 296, the use of opto switches is known in connection with the control of motors as well as the speed control of an electric motor in dependence of the temperature of a system component.

JP 61-234620 describes a switching circuit comprising two anti-parallel connected transistors each connected in series with a blocking diode. The circuit is intended to control the current between an a.c. source and a load.

EP, A1, 381 094 shows a method of coupling phase voltage to a three-phase motor. Switching of the phase voltage takes place via bridge connected thyristors. The control of the switching is accomplished by changing the turn-on angle for the thyristors. Upon e.g. start of the motor the phase voltage is clipped during parts of the period to obtain a winding current which implies a softer start. Then, the turn-on angle can successively be reduced in order to obtain the correct speed. The control signal to one of the two bridge connected thyristors (per phase), is coupled optically.

U.S. Pat. No. 3,866,097 describes a system to couple phase voltage to a three-phase motor. The system differs from that described in EP, A1, 381 094 in that the bridge connections comprise a thyristor and a diode instead of two thyristors.

U.S. Pat. No. 5,070,291 shows an alternative manner to provide a three-phase motor with phase voltage. The motor is supplied with a pseudo-three-phase which is generated by controlling power transistors with pulse width modulated control signals. Instead of coupling an available three-phase signal through, a pseudo-three-phase signal is generated, which has a constant amplitude but a variable frequency.

U.S. Pat. No. 4,716,304 shows a further way of supplying a three-phase motor with a pseudo-three-phase signal. In this example, however, the control signal connected to the power transistors is galvanically separated from the supply voltage.

EP,A1, 357 104 describes the conversion of acoustic signals caused by defects on rotating parts, into electric signals by means of piezoelectric transducers.

EP, A2, 492 739 and U.S. Pat. No. 4,409,548 relate to different methods of measuring rotation speed by means of piezoelectric transducers.

EP,A2, 149 769 describes rotation speed detection by means of optical reading wherein a light modulator in the form a nut is used.

In EP, A1, 221 333 and U.S. Pat. No. 4,132,890 optical reading is described, wherein a disc mounted on the motor shaft is used. The discs have radial equidistant lines which are detected optically.

EP,A1, 66 636 uses also for the same purpose a disc wherein the light beam goes through the disc before it is detected.

DISCLOSURE OF THE INVENTION

The object of the invention is particularly to improve the speed control of one-phase and three-phase motors.

Further objects will be apparent form the below description with reference to the drawings.

A type of circuit according to the present invention is designed to control the speed of a three-phase motor. Such a circuit includes driving stages connected directly to three-phase mains and connected for passing mains voltage directly to the motor windings under control of a pulse width modulated signal, a control circuit adapted to generate the pulse width modulated signal under control of the actual speed of the motor, and a power module in each driving stage. The power module has a bridge connection of two anti-parallel connected power transistors which are each series-connected with a blocking diode for directly receiving and passing the respective half-period of a mains phase to a motor winding. This type of circuit also includes an optical coupling circuit between the control circuit and each power transistor. The optical coupling circuit has an electrically activable light emitting component connected to the control circuit so that the emitted light is modulated by the pulse width modulated signal, and a light sensitive component adapted to, without any external driving voltage of its own, generate an output signal under influence of received light of the kind that is emitted by the light emitting component. The light sensitive component is connected for receiving the pulse width modulated emitted light to generate a voltage modulated by the pulse width modulated signal, which voltage is applied as a control voltage between the control electrode and the emitter of the respective power transistor.

One advantageous embodiment of this first type of circuit allows reversal of the direction of rotation of the motor. In this embodiment, two of the motor phase windings are connected so that they are each supplied from either of the same two mains phases via each of the respective power modules, one for each mains phase, and the third motor phase winding is supplied from the third mains phase via a corresponding power module. The reversal of direction of rotation of the motor is controlled by a rotation direction signal obtained via a logic circuit.

A second type of circuit allows control of the speed of three-phase motors driving resistive and inductive loads. This second type of circuit includes driving stages, a control circuit, a power module and an optical coupling circuit like those in the first type of circuits discussed above, but also includes a zero passage detector between each phase and the optical coupling devices of the corresponding power transistors. The output signal of the zero passage detector is supplied together with the pulse width modulated signal to the optical coupling devices via a logic gate to obtain separate control of each optical coupling device and thereby the corresponding half-period of the phase.

A third type of circuit according to the present invention includes driving stages, a control circuit and an optical coupling circuit like those in the first type of circuit described above, but also includes a power module in each driving stage, which power module has a bridge connection of two anti-parallel connected power transistor stages which are each series-connected with a blocking diode for directly receiving and passing the respective half-period of a mains phase to a motor winding. In addition, each power transistor stage has a first power transistor forming a voltage output stage and a second power transistor connected in parallel thereto and forming a current output stage.

A fourth type of circuit according to the present invention includes driving stages and a control circuit like those in the first type of circuit, but also includes a power module, in each driving stage, that has a bridge connection of first and second anti-parallel connected power transistor stages. The power transistor stages are each series-connected with a blocking diode for directly receiving and passing the respective half-period of a mains phase to a motor winding. The first power transistor stage has a power transistor of N-IGBT type, and the second stage has a MOSFET transistor driven by a bipolar transistor, the emitter and collector of which are connected to the gate and source, respectively, of the MOSFET transistor. This fourth type of circuit also includes an optical coupling circuit between the control circuit and each power transistor stage. The optical coupling circuit has an electrically activable light emitting component connected to the control circuit to have the emitted light modulated by the pulse width modulated signal, and has a light sensitive component adapted to, without any external driving voltage of its own, generate an output signal under influence of received light of the kind that is emitted by the light emitting component. The light sensitive component is connected for receiving the pulse width modulated emitted light to generate a voltage modulated by the pulse width modulated signal, which in the first transistor stage is applied as control voltage between the control electrode of the IGBT transistor and the base of the bipolar transistor, and in the second transistor stage is applied across the emitter-base path of the bipolar transistor.

A fifth type of circuit according to the present invention includes driving stages and a control circuit like the first type of circuit, but also includes a power module in each driving stage, which power module has a bridge connection of two anti-parallel connected power transistor stages which are each series-connected with a first blocking diode for directly receiving and passing the respective half-period of a mains phase to a motor winding. Each power transistor stage also has a first power transistor and a second power transistor. The second power transistor is in series with a second blocking diode directly connecting to the first blocking diode, and is anti-parallel connected with the first power transistor. A charging capacitor also is connected to each connection point between the first and second blocking diode. An optical coupling circuit between the control circuit and each power transistor also is included. The optical coupling circuit has an electrically activable light emitting component connected to the control circuit to have the emitted light modulated by the pulse width modulated signal, and has a light sensitive component adapted to, without any external driving voltage of its own, generate an output signal under influence of received light of the kind that is emitted by the light emitting component. The light sensitive component is connected for receiving the pulse width modulated emitted light to generate a voltage modulated by the pulse width modulated signal, said voltage being applied as a control voltage between the control electrode and the emitter of the respective power transistor.

Another type of circuit is designed for controlling the speed of a one-phase motor. This type of circuit includes a driving stage connected directly to mains and connected for passing mains voltage directly to the motor winding under control of a pulse width modulated signal, a control circuit adapted to generate the pulse width modulated signal under control of the actual speed of the motor, and a power module in the driving stage. The power module has a bridge connection of two anti-parallel connected power transistors which are each series-connected with a blocking diode for directly receiving and passing the respective half-period of the mains voltage to the motor winding. This type of circuit also includes an optical coupling circuit between the control circuit and each power transistor. The optical coupling circuit has an electrically activable light emitting component connected to the control circuit to have the emitted light modulated by the pulse width modulated signal, and has a light sensitive component adapted to, without any external driving voltage of its own, generate an output signal under influence of received light of the kind that is emitted by the light emitting component. The light sensitive component is connected for receiving the pulse width modulated emitted light to generate a voltage modulated by the pulse width modulated signal, which voltage is applied as a control voltage between the control electrode and the emitter of the respective power transistor.

Another type of circuit according to the present invention is designed to control the speed of a three-phase motor driving a compressor in a refrigerating machine. This type of circuit includes driving stages connected directly to three-phase mains and connected for passing mains voltage directly to the motor windings under control of a pulse width modulated signal, a control circuit adapted to generate the pulse width modulated signal under control of the actual speed of the motor and the temperature in the inlet and outlet of the compressor, and a power module in each driving stage, comprising a bridge connection of two anti-parallel connected power transistors which are each series-connected with a blocking diode for directly receiving and passing the respective half-period of a mains phase to a motor winding. An optical coupling circuit between the control circuit and each power transistor also is included. The optical coupling circuit has an electrically activable light emitting component connected to the control circuit to have the emitted light modulated by the pulse width modulated signal, and has a light sensitive component adapted to, without any external driving voltage of its own, generate an output signal under influence of received light of the kind that is emitted by the light emitting component. The light sensitive component is connected for receiving the pulse width modulated emitted light to generate a voltage modulated by the pulse width modulated signal, which voltage is applied as a control voltage between the control electrode and the emitter of the respective power transistor.

According to a further embodiment of the present invention, a switching circuit for a.c. voltage includes a bridge connection of two anti-parallel connected power transistors which are each series-connected with a blocking diode for directly receiving and passing the respective half-period of the mains voltage to a load, and an optical coupling circuit preceding each power transistor. The optical coupling circuit has an electrically activable light emitting component connected to receive a voltage pulse generated by the appearance of the a.c. voltage, and a light sensitive component adapted to, without any external driving voltage of its own, generate an output signal under influence of received light of the kind that is emitted by the light emitting component. The light sensitive component is connected for receiving a light pulse generated when the voltage pulse is supplied to the light component to generate a corresponding output signal which is applied as opening pulse between the control electrode and the emitter of the respective power transistor.

According to an advantageous embodiment of the above mentioned circuit, the opening pulse is obtained from a capacitor charged via the blocking diodes, which capacitor is connected across the light emitting diodes.

Optionally, in any of the above described circuits, an amplifier stage may be provided between the optical coupling circuit and the respective power transistor. The amplifier stage obtains its supply voltage via a further optical coupling circuit of the same kind as the first mentioned coupling circuit. Moreover, in any of these circuits, the light emitting component may be a light emitting diode component, the supply voltage of which is modulated by the voltage pulse, and the light sensitive component may be a light sensitive diode component of solar cell type. The light emitting and light sensitive components may optionally be coupled for light transmission via a fiber optical cable.

Optionally, the actual speed of the motor may be detected using a bar code reader directed towards a bar strip applied around the motor shaft or using a piezoelectric microphone which measures the pulse width of the frequency emitted by the motor.

Another type of circuit according to the present invention is designed to control the supply of current to a current consuming load supplied by a one-phase or multi-phase mains. Such a circuit includes one or a plurality of driving stages connected directly to a mains phase for passing mains voltage directly to the load under control of an opening signal, a control circuit adapted to generate the opening signal under control of a control parameter, and a power module in the driving stage. The power module has a bridge connection of two anti-parallel connected power transistor stages which are each series-connected with a blocking diode for directly receiving and passing the respective half-period of the mains voltage to the load and comprise one or a plurality of power transistor functions. This type of circuit further includes an optical coupling circuit between the control circuit and each power transistor function. The optical coupling circuit has an electrically activable light emitting component connected to the control circuit to have the emitted light modulated by the opening signal, and has a light sensitive component adapted to, without any external driving voltage of its own, generate an output signal under influence of received light of the kind that is emitted by the light emitting component. The light sensitive component is connected for receiving the pulse width modulated emitted light to generate a voltage modulated by the opening signal, which voltage is applied as a control voltage for the power transistor functions.

In an alternative embodiment, a plurality of driving stages are connected directly to three-phase mains for passing mains voltage directly to the motor windings under control of a pulse width modulated signal, and the control circuit is adapted to generate the pulse width modulated signal under control of the actual speed of the motor. In this alternative embodiment, the power transistor stages are adapted to pass the respective half-period of a mains phase to a motor winding, the light emitting component is connected to the control circuit to have the emitted light modulated by the pulse width modulated signal, and the light sensitive component is connected for receiving the pulse width modulated emitted light to generate a voltage modulated by the pulse width modulated signal, said voltage being applied as said control voltage.

Optionally, the power transistor functions may each include a power transistor, with the control voltage applied between the control electrode and the emitter thereof.

In another embodiment, a zero passage detector is provided between each phase and the optical coupling devices of the corresponding power transistors, the output signal of the zero passage detector is supplied together with the pulse width modulated signal to the optical coupling devices via a logic gate to obtain separate control of each optical coupling device and, thereby, the corresponding half-period of the phase.

In a further embodiment, each power transistor stage has a first power transistor forming a voltage output stage, and a second power transistor connected in parallel thereto, forming a current output stage.

In another embodiment, the first power transistor stage has a power transistor of N-IGBT type and the second stage has a MOSFET transistor driven by a bipolar transistor, the emitter and collector of which are connected to the gate and the source respectively of the MOSFET transistor, and the control voltage of the first transistor stage is applied between the control electrode of the IGBT transistor and the base of the bipolar transistor and of the second transistor stage across the emitter-base path of the bipolar transistor.

In another embodiment, each power transistor stage has a first power transistor and a second power transistor, which is in series with a second blocking diode directly connecting to the first blocking diode and is anti-parallel connected with the first power transistor. A charging capacitor is connected to each connection point between the first and second blocking diode.

According to a further aspect, in an apparatus for detecting the speed and direction of rotation of a rotating shaft, a bar code reader is directed towards a bar strip fixed around the motor shaft, and has two reflection detectors for reading the bar strip and each intended for one of the directions of rotation of the shaft. The output signals of the bar code reader, one from each reflection detector, are supplied to a processing circuit which is adapted to based on the number of pulses per rotation detected by the detectors, emit output signals, one for each direction of rotation of the shaft.

According to still a further aspect, an apparatus for detecting the speed of a rotating electric motor shaft has a piezoelectric microphone which is mounted on the motor to receive humming stray noise generated by vibrations of the windings of the electric motor, and the microphone signal is supplied to a measuring device which measures the pulse width of this humming stray noise.

DESCRIPTION OF DRAWINGS

Embodiments of the invention will now be described more in detail below with reference to the appended drawings on which FIGS. 7b and 7c are diagrams showing the shape of output signals from the apparatus according to FIG. 7a, FIG. 8 shows an apparatus for measuring the speed of the rotating shaft of an electric motor, FIGS. 9 and 10a show modifications of the circuit solutions according to FIGS. 2 and 3a, respectively, intended to be used i.a. for power control of resistive and inductive loads.

FIG. 10b shows the shape of signals appearing in different places in the circuit according to FIG. 10a.

FIG. 11a shows a further modification of a circuit solution intended to be used for power control of resistive and inductive loads, FIG. 11b shows the shape of a signal present in the circuit according to FIG. 11a, FIG. 12 shows still another modification of a circuit solution intended to be used for power control of resistive and inductive loads, FIG. 13a shows a further modification of a circuit solution intended to be used for power control of resistive and inductive loads, and FIG. 13b shows shapes of signals present in the circuit according to FIG. 13a.

FIG. 13c shows enlarged shapes of signals present in the circuit according to FIG. 13a.

DESCRIPTION OF PREFERRED EMBODIMENTS

Figure 1:
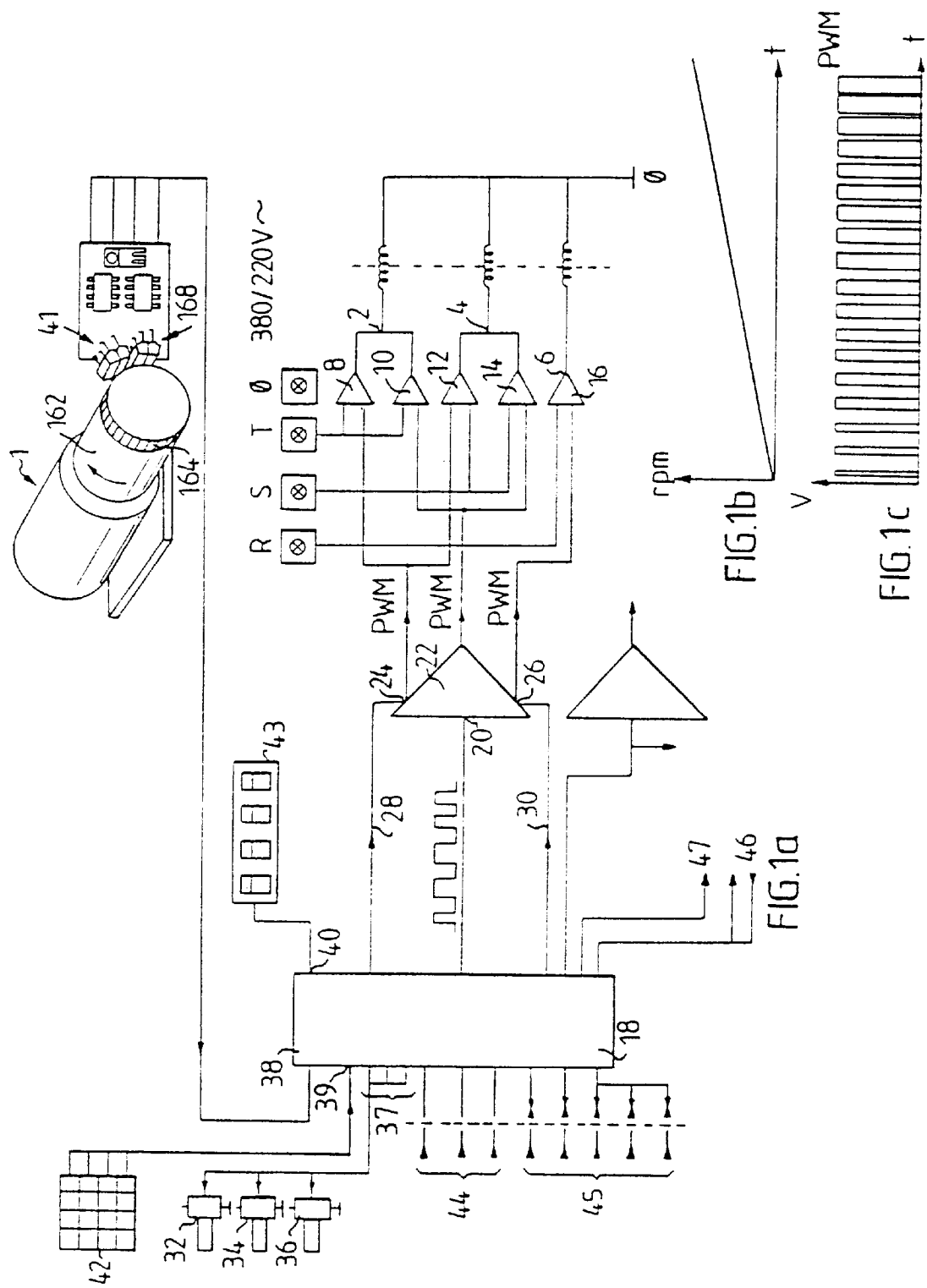
FIG. 1a is an overall view of a circuit solution for speed control of a three-phase motor.
FIGS. 1b and 1c are diagrams illustrating the generation of a PWM signal used for controlling purposes in the circuit according to FIG. 1a, FIG. 2 shows in greater detail a circuit included in FIG. 1a, FIG. 3a shows an example of an embodiment of driving stages present in FIGS. 1a and 2 with circuits for galvanic separation.

FIG. 1 shows a circuit for controlling the speed of a three-phase motor indicated by 1, the motor windings of which being shown connected to phase outputs 2, 4 and 6, respectively, from the circuit. The circuit comprises driving stages 8, 10, 12, 14, 16 connected directly to three-phase mains R, S, T. The passing of mains voltage by the driving stages directly to the motor windings 2, 4, 6 being controlled by a pulse width modulated signal PWM. The pulse width modulated signal PWM is generated by a control circuit 18 under control of the actual speed of the motor and is supplied to the driving stages 8, 10, 12, 14 and 16 via an input 20 of a logic circuit 22 which also have inputs 24 and 26 to receive a direction signal 28 and an activating signal 30, respectively, from the control circuit 18.

As apparent from FIGS. 1 and 2, each of the phase outputs 2 and 4 are supplied from either of the same two mains phases R, S via two power modules 8, 10 and 12, 14, respectively, each, one for each mains phase, and the third phase output 6 is supplied from the third mains phase T via the power module 16. This design of the circuit arrangement in question enables reversal of the direction of rotation of the motor, the reversal being controlled in a manner to be described more in detail below by the direction signal supplied to the logic circuit 22.

The generation of the pulse width modulated signal is illustrated in FIGS. 1b and 1c, where FIG. 1b illustrates the actual speed of the motor, and FIG. 1c illustrates the generated PWM signal. In the latter, the frequency is fixed but the pulse width increases proportionally to the actual speed to a predetermined set value. The generation of the PWM signal is controlled by a set rate of increase for the pulse width, which can be programmed in dependence of the starting time.

Schematically indicated in FIG. 1a are setting means 32 for presetting the speed up to a maximum, setting means 34 for presetting the pulse width of the signal PWM up to a maximum value, and setting means 36 for presetting a soft start. Soft start comprises presetting of time, e.g. from 0 to 110 s and start-up to a set speed and pulse width value of the PWM-signal. The setting means 32, 34 and 36 have outputs, each forming an input to the control circuit as indicated at 37. At 38, 39 and 40, the control circuit 18 has inputs from a sensor 41 for motor speed and direction of rotation, a keyboard 42 and a display 43, respectively. The sensor 41 will be described more in detail below.

The control circuit 18 can have a number of further inputs depending on the application, which will be set forth as examples below.

Thus, 44 denotes three inputs for manual control: forwards, backwards and stop, respectively.

45 denotes five signal inputs from a piezoelectric transducer to be described more in detail below, which constitues an alternative actual speed detector, a horizontal-vertical wave sensor for overload protection, a heat detector as motor protection, an over-current protector in the form of a shunt which can be series-connected with the load to stop the transmission of the PWM-signal upon malfunction or overload, and a fluid detector, respectively, as motor protection in connection with pump applications.

At 46, inputs and outputs are indicated, which facilitate a two-way communication in applications where the control is carried out via computer or process control.

At 47, a control signal is supplied to a contactor for interrupting the supplied voltage upon malfunction.

The control circuit can e.g. be a VLSI microprocessor of the type 68HC11, made by Motorola, which is well known to anyone skilled in the art. Thus, its method of operation to carry out the described functions does not have to be described more in detail.

In FIG. 2 the logic circuit 22 is shown. The PWM-signal and the activating signal are supplied via their inputs 20 and 30, respectively, each to one input of a first AND gate 50. The output of the AND gate 50 is connected to an input of two further AND gates 52 and 54, respectively, as well as to an input 56 of the driving stage 16. The direction signal received on the input 28 is supplied to an inverting IC circuit 58 and to the other input of the AND gate 52. The output of the circuit 58 is connected to the other input of the AND gate 54. The output of the AND gate 52 is connected to inputs 60 and 62 of the driving stages 10 and 14, respectively, and the output of the AND gate 54 is connected to inputs 64 and 66 of the driving stages 8 and 12, respectively.

With reference to FIG. 3a each of the driving stages 8, 10, 12, 14 and 16 comprises a bridge connection 68 of two anti-parallel connected power transistors 70 and 72, respectively, having a control electrode 71 and 73, respectively. The power transistor 70 and 72 are each series-connected with a blocking diode 74 and 76, respectively, for directly receiving and passing the respective half-period of a corresponding mains phase R, S, T to one of the motor windings 2, 4 or 6.

The power transistors 70 and 72 can be of the IGBT type (Insulated Gate Bipolar Transistor), and the diodes 74 and 76 can be of the HEXFRED type (Ultra Fast Recovery Diode), both components manufactured by International Rectifier.

The control electrodes of the power transistors 70, 72 are connected to be controlled by the pulse width modulated signal PWM via each one driving stage in the form of a light emitting diode/solar cell component 78 and 80, respectively, which galvanically separates the control circuit 18 from the respective driving stage 8-16. The components 78 and 80 can e.g. each be a light emitting diode/solar cell component of e.g. the type PIC Microelectronic Relays made by International Rectifier, e.g. a so called photo-voltaic relay having the product number PVI1050.

The semiconductor components 78 and 80 comprise on their input side between a first input terminal 82 and 84, respectively and a second input terminal 86 and 88, respectively, light emitting diode elements coupled with the conduction direction from the input terminal 82 and 84, respectively. From the d.c. voltage source VCC a bias voltage is applied over the light emitting diode elements 90 via a voltage divider indicated at 92. On their output side the semiconductor components 78 and 80 comprise between a first output terminal 84 and 96, respectively, and a second output terminal 98 and 100, respectively, a number of, two in one embodiment, series-connected light sensitive diode elements 102 adapted to receive light emitted by the light emitting diodes and with the conduction direction from the output terminal 94 and 96, respectively. The light sensitive diode elements are in fact of a solar cell type which upon illumination generate a current without requiring any external supply voltage.

The associated light emitting diode elements 90 and solar cells 102 can, as in the above mentioned type PVI1050, be encased in a light-proof housing at a short distance from each other. With reference to FIG. 3b, however, in applications which require a greater insulating distance between the electronic control circuit 18 and the solar cell component 102, according to a very advantageous embodiment, the light from the light emitting diode component 90 can be coupled via fiber optics 103 to the solar cell component. The output terminal 94 and 96, respectively, is connected to the control electrode 71 and 73, respectively, of the power transistor 70 and 72, respectively. The output terminal 98 and 100, respectively, is connected to the emitter of the transistor 70, which is connected to the phase output 2/4/6, and the emitter of the transistor 72, which is connected to the diode 76, respectively.

The PWM signal is supplied via a driving stage 104 and 106, respectively, for signal amplification, to the input 86 and 88, respectively, of the solar cell components 78 and 80, respectively. The bias voltage over the light emitting diodes 90 is thereby modulated by the PWM signal so that the light emitting diodes emit light pulses thereby modulated by the same signal towards the light sensitive diode elements 102. This in turn generates a voltage modulated by the PWM signal over the light sensitive diode elements 102 and thereby, on the one hand, between the control electrode 71 and 73, respectively, and, on the other hand, the respective emitter.

Figure 3C:
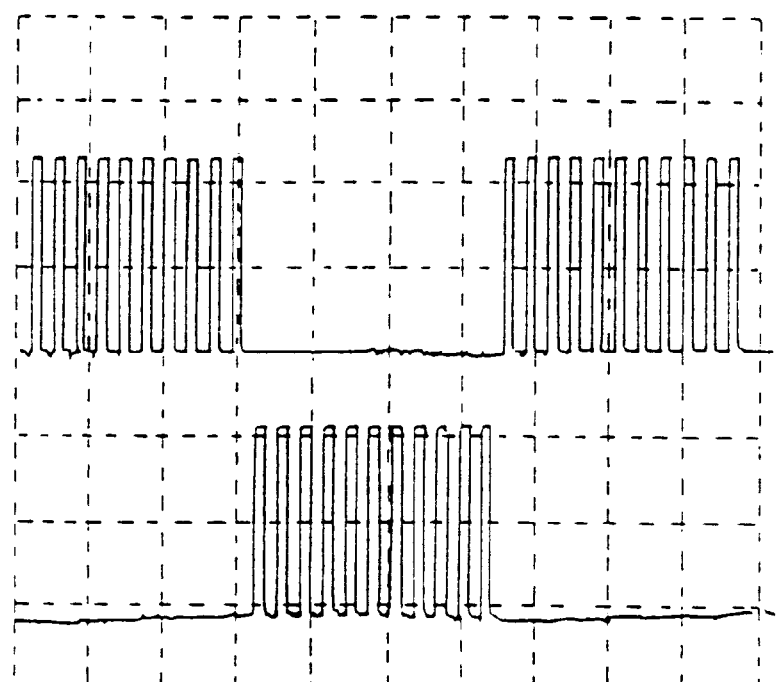
FIG. 3b shows a modification of an essential component included in FIG. 3a, FIGS. 3c and 3d are diagrams illustrating signal wave forms obtained in the circuit according to FIG. 3a, FIG. 3e shows a circuit addition for modifying the circuit shown in FIG. 3a, FIG. 4 shows an example of a circuit for controlling the speed of a one-phase motor.

In FIG. 3c the upper and lower curves illustrate the shape of the PWM pulses into the control electrodes 71 and 73, respectively, of the power transistors 70 and 72, respectively.

Figure 3D:
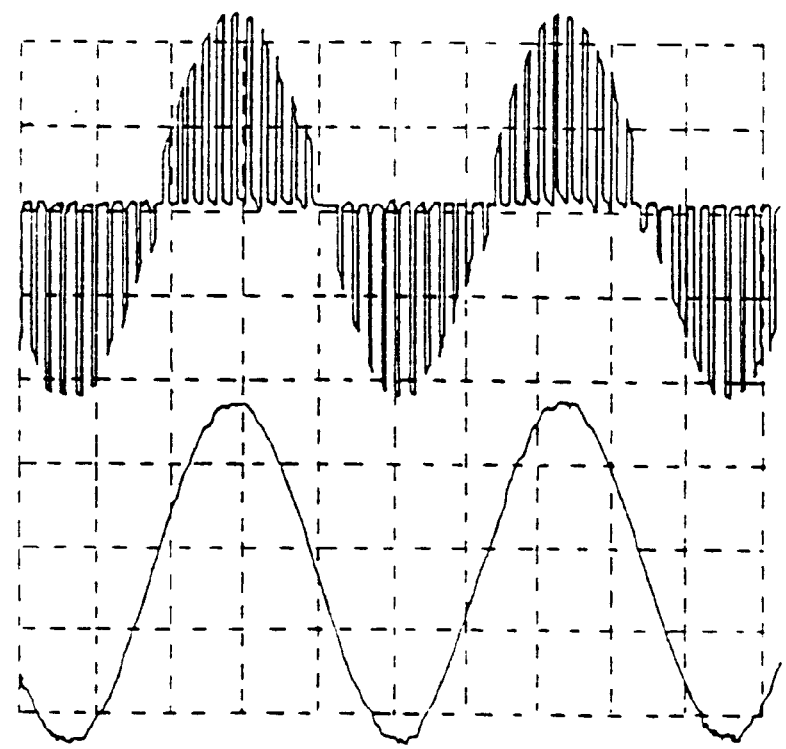

In FIG. 3d the upper and lower halves of the upper curve illustrate the voltages passed by the transistors 70 and 72, respectively, and the PWM pulse voltages across the load respectively, while the lower curve illustrates the corresponding incoming phase voltage.

What is essential concerning the function of the power transistors 70 and 72 is that they shall have very fast rise and fall times when pulsed with the PWM modulated signal applied to the control electrodes 71 and 73, respectively. Thus, as an example the rise time shall be of the order of magnitude of 2.5 $\mu$s and the fall time of the order of magnitude of 50 $\mu$s. With such rise and fall times, the heat loss will be low.

The requirement on the diodes 74 and 76 is that they should be extremely fast. This requirement is fulfilled as an example by the above mentioned type HEXFRED which is connected as a free wheel diode. By using a component of this type self-oscillation is prevented at the zero level of the off-time of the power transistors which otherwise would cause the emitter of the power transistors to receive the wrong polarity. A further advantageous feature of blocking diodes of the defined type is that their intrinsic heat during the rise and fall times will be sufficiently low.

A power transistor of the above type IGBT exhibits concerning its reaction to signals on the control electrode, the same characteristic as a field effect transistor. There is a capacitance between the control electrode and the emitter, which leads to that for every pulse on the control electrode, the voltage level thereon tends to stay up and keep the power transistor open. This in its turn means that in some applications light emitting diode/solar cell components of the type described above could per se be considered as less suitable as the only component in driving stages for these power transistors due to the fact that no back current can pass through the solar cell components.

The consequence is that the IGBT transistors will not be fully operated and that the fall time will not be short enough, which causes generation of heat in the transistors. To take care of that and obtain an extra contribution of voltage and current, according to a further embodiment a circuit of the kind shown in FIG. 3e is inserted between each of the components 78 and 80 and the control electrode 71 and 73, respectively, of the corresponding power transistor 70 and 72, respectively.

Figure 3E:
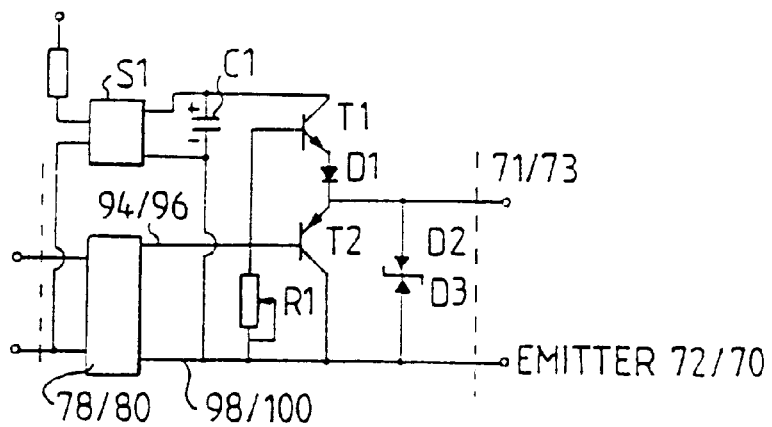

The circuit addition shown in FIG. 3e comprises, parallel to the corresponding light emitting diode/solar cell component 78/80, a further light emitting diode/solar cell component S1 which across the light emitting diode element receives only a bias voltage which is constant all the time for transferring constant light to the corresponding solar cell element. To store the energy from the component S1, a capacitance C1 is connected parallel across its output. S1/C1 supply voltage to two transistor stages T1 and T2 of NPN and PNP type, respectively, series-connected across C1. The base electrodes of the transistors T1, T2 are connected in common to the output 94/96 of the component 78/80. The emitter of the transistor T1 is via a diode D1 connected to the control electrode of the corresponding power transistor 70/72 as well as to the emitter of the transistor T2. The collector of the transistor T2 is for the power transistors 70 and 72 connected to the emitter of the respective other power transistor.

A positive flank of the PWM signal into the component 78/80, opens T1 and closes T2. This causes current to flow from S1 and C1 throught the transistsor T1 and the diode D1 to the control electrode of the power transistor 70/72 and the power transistor opens.

A negative flank of the PWM signal closes T1 and opens T2 which means that the control electrode and the emitter of the power transistor 78/80 are short-circuited and the power transistor is closed.

The diode D1 and diodes D2–D3 form a transient protection, e.g. at 18 V. A settable resistor R1 across the component 78/80 is used for setting the shortest on/off time.

As apparent from the above, the light sensitive diode elements 102 do not require any external supply voltage contrary to the illuminated semiconductors included in conventional opto couplers. Instead, the light sensitive diode elements 102 generate their own operating voltage under influence of the light pulses modulated by the PWM signal. This has the advantage that the output signal from the driving stage can have a floating potential. In the one case, the potential of the power transistor 72 and thereby the component 80, is locked to the phase voltage. In the other case, the potential of the power transistor 70 and thereby the component 78, is locked to the potential towards the load.

Figure 4:
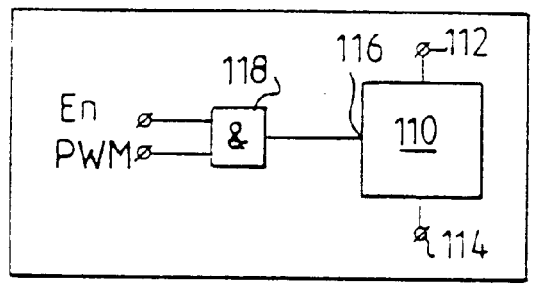

With reference to FIG. 4 a circuit for controlling the speed of a one phase motor can comprise a driving stage 110 connected directly to mains, the passing of mains voltage of which, at 112, directly to the motor winding at 114 being controlled by a pulse width modulated signal PWM which is generated by a control circuit which is not shown but corresponds to the circuit 18 in FIG. 1, under control of the actual speed of the motor. In the same manner as shown in FIG. 3a, the driving stage 110 can be made up of a bridge connection of two anti-parallel connected power transistors, which are each series-connected with a blocking diode for directly receiving and passing the respective half-period of the mains voltage to the motor winding. Also, in the same manner as in FIG. 3a, the control electrodes of these power transistors can be connected for receiving the pulse width modulated signal via driving stages corresponding to the driving stages 78 and 80 in FIG. 3a.

The signal PWM is received on an input 116 from the output of an AND gate 118 corresponding to the logic circuit 22 in FIG. 1 and whose two inputs are supplied with the pulse width modulated signal PWM and an activating signal En.

Figure 5:
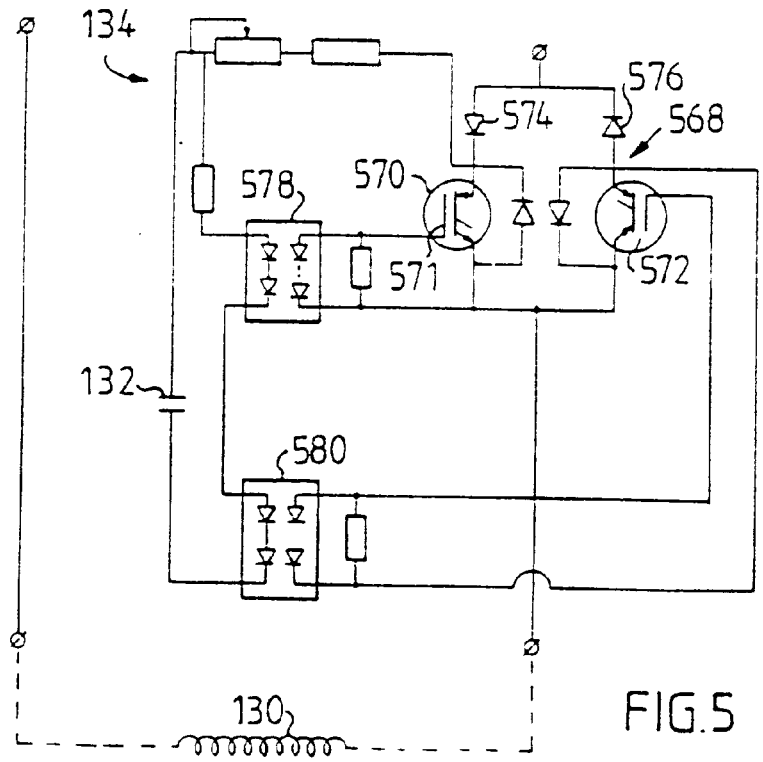
FIG. 5 shows an a.c. voltage switching circuit, FIG. 6a schematically illustrates a field of use for a circuit of the kind shown in FIGS. 1a and 2.

FIG. 5 illustrates how a circuit constructed in accordance with the inventive principle, can be used for one-phase soft start alternatively a.c. switching circuits. The circuit is intended to supply a load 130, e.g. a motor winding, and is constructed principally in the same manner as the driving stage shown in FIG. 3a. Therefore, in FIG. 5 the same circuit components as in FIG. 3 have obtained the same denotation as in the latter figure, preceded by 5. Briefly, the circuit comprises a bridge connection 568 of two anti-parallel connected power transistors 570, 572 which are each series-connected with a blocking diode 574, 576 for directly receiving and passing each one half-period of an a.c. voltage of e.g. 220 V.

Each of the power transistors 570, 572, is however, contrary to in FIG. 3a, connected to receive an opening pulse produced by the appearance of the a.c. voltage, on its control electrode via the light emitting diode/solar cell component 578 and 580, respectively. The opening pulse is e.g. obtained from a capacitance 132 charged by the a.c. voltage via the blocking diodes 574, 576, and connected across the solar cell components 578 and 580. When voltage is applied to the bridge connection 568, the capacitor 132 is charged via a voltage dividor circuit 134 and opens the solar cell components which in their turn open the transistors 570, 572 to the load 130.

Figure 6A:
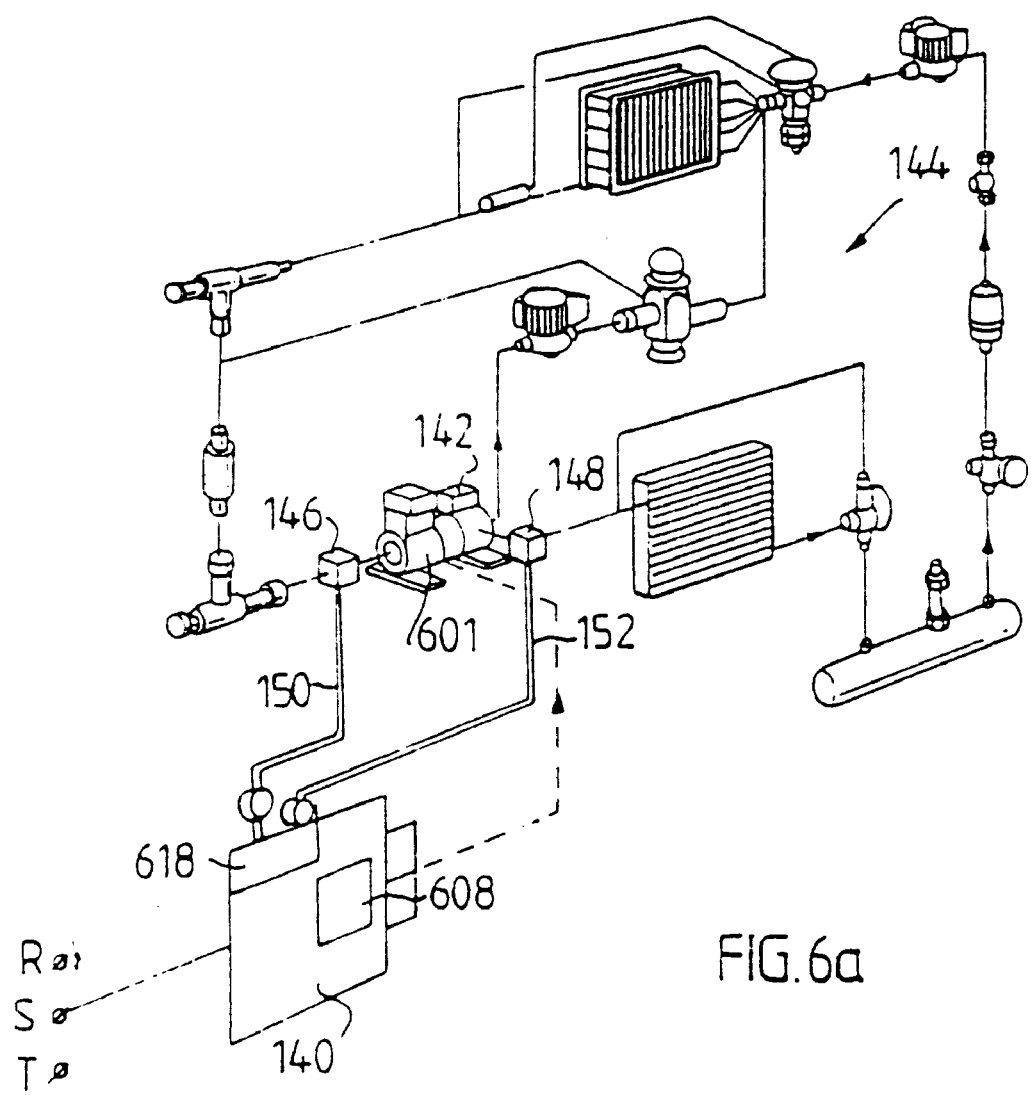
FIG. 6b shows in a larger scale a detail included in FIG. 6a, FIG. 7a shows an apparatus for measuring the speed and direction of rotation of a rotating shaft.

FIG. 6a schematically illustrates a field of use for a circuit of the kind shown in FIGS. 1 and 2.

More exactly, with reference to FIG. 6a, that figure concerns a circuit 140 for controlling the speed of a three-phase motor 601, which drives a compressor 142 in a schematically shown refrigerating machine generally denoted 144. The refrigerating machine itself can be of the kind that is well known to anyone skilled in the refrigerating art, who well recognizes the components schematically indicated in FIG. 6a, which, thus, do not have to be described in any greater detail in this connection.

The principle operating method of a refrigerating machine can be described with reference to a simple cyclical process based on saturated liquid and dry saturated gas.

This method of description does not take into consideration the pressure drops that appear in condensor, evaporator and tube system when the refrigerant flows through the system. A faulty dimensioning and mounting of the tube system of a refrigerating plant can result in large power losses due to undesired pressure drops within the system.

In a real cyclical process, moreover, the compression will follow a somewhat different course than the isotrope that the ideal process follows. This is due to circumstances within the compressor and results in a greater compression work and higher temperature after the compression.

In the simple cyclical process, the refrigerant vapour was thought to be dried and saturated when it is sucked into the compressor. This means that temperature and pressure have the interrelated values to be found in a table for saturated vapour. Small deviations (in e.g. the function of the restriction means) can result in that the vapour will contain so much liquid that there is a risk for overheating in the compressor. Compressor brakedowns where valves and pistons are destroyed, are in many cases the result of an uncontrolled admixture of liquid in the suction type.

Most of today's systems have a thermostatic expansion valve as restriction means with the sensor body placed immediately after the evaporator outlet. In this type of valve it is the change in the overheating of the vapour from the evaporator that gives a signal to control. A certain overheating is necessary for operating these systems. If the valve is correctly set, it protects at the same time the compressor against hammering.

An undesired overheating is caused by transfer of heat to the suction pipe between the evaporator and the compressor. This flow of heat is a pure loss since it does not have any useful refrigerating effect. If the suction pipe is insulated, therefore the operating costs will be lower at the same time as there will be no condensation.

Disregarding the pressure drop in the suction pipe, the overheating takes place at a constant pressure. The pressure in the evaporator (outlet) is thus the same as at the suction socket of the compressor.

Liquid is formed in the compressor when the condensation temperature exceeds a certain value. To avoid that this occurs, a soft start/speed control according to the invention can be used in the manner described below to control the process.

Figure 6B:
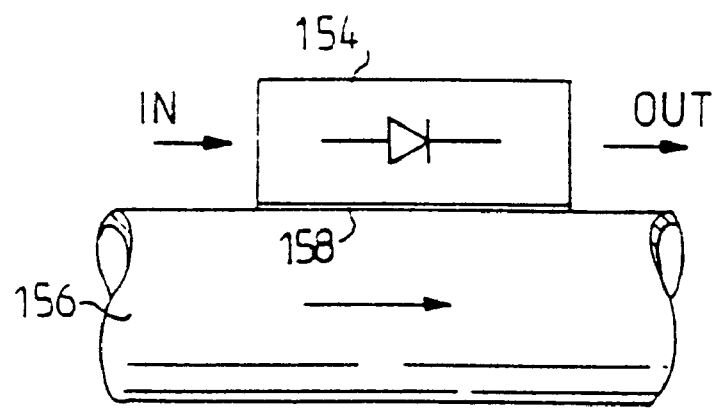

At 608 in FIG. 6a one of the five driving stages for the motor windings, connected directly to three-phase mains according to FIG. 1 and 2, is indicated, and at 618, the control circuit for the driving stages, is indicated. Besides controlling as in FIGS. 1 and 2, the passing of mains voltage by the driving stages directly to the motor windings by means of pulse width modulated signals generated independence of the actual speed of the motor, a control also takes place in dependence of the temperatures in the inlet and outlet of the compressor 142. Temperature sensors for the latter purpose, indicated at 146 and 148, respectively, are connected to the control circuit 140 via signal lines 150 and 152, respectively. The temperature sensors can with reference to FIG. 6b, e.g. be made up of a diode 154 of the type 1N4148 manufactured by Texas Instruments. It is attached to the, at 156, indicated inlet and outlet pipe, respectively, of the compressor 142 by means of a glue layer 158.

As in FIGS. 1 and 2 the driving stages are constructed with power modules each comprising a bridge connection of two anti-parallel connected power transistors which are each series-connected with a blocking diode for directly receiving and passing each one half-period of a mains phase to a motor winding, and whose control electrodes are connected via a solar cell component for receiving the pulse width modulated signal.

The actual speed and direction of rotation of the motor can, besides by means of conventional arrangements, be detected by means of either of two special arrangements illustrated in FIGS. 7 and 8.

In FIG. 7a and in a smaller scale in FIG. 1, a bar code reader 160 is schematically shown directed towards a bar code reader 160 comprises two schematically shown reflection detector arrays 166 and 168, respectively, each intended for one direction of rotation of the shaft. The reflection detectors 166 and 168 can be of a type known per se. The output signals of the bar code reader, one from each reflection detector, are supplied to a processing circuit 169 which is adapted to, on the basis of the number of pulses per rotation detected by the detectors 166 and 168, emit output signals Va and Vb, respectively, one for each direction of rotation of the shaft 162, for transfer to the control circuit 18. Terminals for supply of voltage and ground to the circuit 170 are indicated at 172 and 174, respectively. In the diagrams in FIG. 7b and 7c, respectively, the shape of the two output signals Va and Vb, is schematically indicated. In FIG. 7a the bar code is shown applied to the outside of the shaft. It is however as well possible to attach it on the inside of a hollow shaft, it that is considered more suitable.

In FIG. 8a, very schematically, an arrangement is shown where the speed of a motor, e.g. the fan motor 601 according to FIG. 6a, is detected by means of a piezoelectric microphone 176, which measures the pulse width of the frequency that is emitted by the motor and which can be of the same type as used in modern telephones. At 178, an output is indicated for the signals from the microphone to the control circuit 18, and at 180 and 182 inputs are indicated for voltage feed and ground connection, respectively.

The measuring arrangement in question is based on the knowledge that vibrations in the windings of an electric motor create a humming stray noise which is superimposed on a fundamental frequency of e.g. about 1000 Hz of the normal motor sound. This humming stray noise forms pulses, the pulse width of which varies in a pulse width modulated manner in dependence of the motor speed according to what is shown in FIG. 8b and which can be detected by the microphone. The microphone signal is applied to a not shown A/D converter which measures the width of the pulse and whose output signal is supplied to the control circuit 18 for generating the pulse width modulated signal intended for the driving stages 8–13.

The microphone 176 is applied e.g. by gluing and its location on the motor 601 is based on testing an optimal value of humming noise versus PWM-signal from the control circuit 18.

The microphone arrangement described above can contrary to the bar code arrangement only be used in applications where no direction signal is required as for example in refrigeration processes and for fan control. The bar code arrangement according to FIG. 7a can advantageously be used in apparatuses such as traverses where there are visible shafts and information about the direction of rotation is required. In e.g. encapsuled fans, there is no possibility is build in a sensor which means that piezoelectric elements are well suited for this purpose.

A circuit solution of the kind shown in FIGS. 2 and 3a in which the power transistors 70 and 72 are of the IGBT type, can be modified according to FIGS. 9 and 10, respectively, to be used i.a. for power control of resistive loads such as illumination, battery charging systems for operation of electric cars, and radiators, as well as of inductive loads such as motors. More definitely, with this design it is possible to compensate the fact that IBGT transistors only exist as N types as will be apparent from the below.

The circuit according to FIG. 9 is constructed in principle in the same manner as the circuit according to FIG. 2, and the circuit according to FIG. 10a is constructed in principle in the same manner as the circuit according to FIG. 3a by inserting the circuit according to FIG. 3a in the manner described above. The difference is that the driving stages 104 and 106 are shown as the transistor amplifiers they are and that the polarity of the inputs of the light emitting diode/solar cell components has been reversed relative to FIG. 3a. In FIGS. 9 and 10a, therefore, the same circuit components as in FIGS. 2, 3a and 3e have obtained the same denotation as in the latter figures.

The blocks 8–16 in FIG. 9 corresponding to the power modules 8–16 in FIG. 2 have been completed with circuits 170 for zero passage detection, one for each phase, to obtain separate control of the phase halves. Moreover, each of the blocks 8–16 is as shown in FIG. 10a on the input provided with an opto coupler 180 for galvanic separation towards the corresponding zero passage circuit 170. After the opto coupler 180, a logic gate circuit, in general denoted 190, follows. The load, the power of which is to be controlled, is indicated at 200.

A technique known per se can be used for the zero passage detection. Thus, the circuits 170 are not shown in more detail in this connection. Briefly, each half-period is conducted via a diode to either of two voltage dividers which are connected to the inputs of an operational amplifier. The signal appearing from the voltage divider for positive half-periods is supplied to the operational amplifier which outputs a 50 Hz constant level during the positive half-period. During the negative half-period, the output signal of the operational amplifier is zero. The output signal of the operational amplifier which e.g. can be of the type LM324, drives in its turn the opto coupler 180.

When the phase voltage changes polarity from positive to negative, the IGBT transistor 72 has to be turned with the emitter against the negative phase-half in order to have the right polarity. This is attained by means of the logic gate circuit 190 which receives the output signal from the zero passage detector and the PWM signal.

More in detail, with reference to FIG. 10a, the output signal from the opto coupler 180 is supplied to one of the inputs of a NAND circuit 201 whose other input receives the PWM signal. Moreover, the output signal from the opto coupler 108 is applied via an inverter 202 to one of the inputs of a further NAND circuit 204 whose other input also receives the PWM signal. The outputs of the two NAND circuits 200 and 204 are connected to the input stage for the light emitting diode/solar cell component 78 and 82, respectively.

In the arrangement shown, the input of the NAND circuits 200 and 204 connected to the output of the opto coupler 180 obtains at a high output from the opto coupler 180 a high and low level, respectively, in the latter case due to the inverter 202. This means that the PWM signal is supplied to the transistor 70 only during the positive phase half, and to the transistor 72 only during the negative phase half.

In FIG. 10b the signal shape is shown during a positive phase followed by a negative phase in due order on the input 82 of the light emitting diode/solar cell component 78, the output of the NAND circuit 200, the output of the NAND 204, the input 84 of the light emitting diode/solar cell component 80, and the output of the opto coupler 180.

FIG. 11a shows a modification of the circuit in FIG. 3a, which is intended to compensate that, due to the moment in the motor, the voltage and the current do not follow each other, i.e. a phase displacement arises. Normally, this phase displacement is compensated by a net of capacitors across the load, a measure which is not possible in the present case since the load is pulsed.

More in detail, in FIG. 11a the two power transistors 70, 71 in FIG. 3a have been replaced by each two power transistors 220', 220" and 222', 222", respectively, which can be of IGBT type. The transistor 220' is a voltage output stage which builds up the magnetic field in the air gap of the motor and then turns off when the current starts to flow when the transistor 220" takes over, which is a current output stage. The inputs 224 and 226 are alternately PWM controlled from the control circuit 18 (compare FIG. 1) wherein as before the PWM signal is supplied to the control electrodes of the transistors 220' and 220" via each one light emitting diode/solar cell component 228 and 230, respectively.

For the negative phase-half the transistors 222' (voltage) and 222" (current) have the corresponding functions. Inputs 232 and 234 are alternately PWM controlled and via light emitting diode/solar cell components 236 and 238, respectively, connected to the control electrodes of these transistors.

By means of the described and shown arrangement, the transistors 220" and 222" compensate the phase displacement between current and voltage. FIG. 11b illustrates the pulsed voltage across the load.

A further alternative embodiment of the part of the power modules in the previous embodiments, which comprises two anti-parallel connected IGBT transistors with associated solar cell component, is shown in FIG. 12. More definintely, also according to that embodiment it can be compensated that IGBT transistors only exist as N type.

In FIG. 12, the power transistor that in previous embodiments has taken care of the negative phase-half, has been replaced by a MOSFET transistor 240, e.g. of the type IRF 730, which is driven by a bipolar PNP transistor 242. The emitter 244 and collector 246 of the bipolar transistor are connected to source 248 and gate 250, respectively, of the MOSFET transistor. A light emitting diode/solar cell component 252 receives on its input 254 the PWM signal, and its output 256 is connected to the control electrode of the power transistor 258 for the positive phase-half, and to the base of the transistor 242. The transistor stage 242 is supplied with voltage via a light emitting diode/solar cell component 260.

The transistor 258 is supplied with positive potential and when the phase voltage goes negative, the MOSFET transistor 240 is supplied and opened via the transistor 242.

FIG. 13a shows a circuit intended for saving energy in case of an inductive load. A pulse supplied to an inductive load obtains the opposite polarity when it is turned off. The energy that is generated is magnetic and has to be dissipated. Magnetism in motion is transformed in e.g. an electric motor into an electric current. Conventionally the current due to the inductive spike of opposite polarity when an inductive load is turned off, is leaked through a resistor or a transistor. That means that surplus energy in the form of heat arises in the resistor or the thyristor. As is described more in detail below, in the present case, an IGBT transistor is used to leak surplus energy back to a capacitor for later use.

The circuit in FIG. 13a comprises in the same manner as the embodiments according to FIG. 10 a power transistor 262 and 264, respectively, in series with a first blocking diode 266 and 268, respectively, to take care of the positive and the negative phase-half, respectively.

A second power transistor 270 and 272, respectively, is in series with a second blocking diode 274 and 276, respectively, directly connecting to the first blocking diode 266 and 268, respectively, anti-parallel connected with the first power transistor 262 and 264, respectively. A charging capacitor 278 and 280, respectively, connects to the connection point between the first and second blocking diode 266, 268 and 274, 276, respectively. All four power transistors receive as before PWM pulses via each one light emitting diode/solar cell component 282, 284, 286 and 288, respectively.

During the positive half-period, the PWM pulses are supplied via the component 282 to the control electrode of the power transistor 262. When the pulses of the voltage across the load are zero, the transistor 272 opens and leaks the thereby appearing negative spikes from the inductive load to the capacitor 280 which is charged with negative voltage that is stores to be available as extra energy when the negative half-period occurs.

During the negative half-period the same process takes place in the transistors 264 and 286 to leak positive spikes from the inductive load and charge the capacitor 278 with positive voltage which is stored to be available as extra energy when the positive half-period occurs.

In FIG. 13b, in the upper and lower half of the diagram, the voltage across the load and the input phase voltage, respectively, are shown. 290 and 292 denote the voltage pulse across the load for the negative phase half, and the accompanying positive spike, respectively. In the same manner, 294 and 296 indicate for the positive phase-half, the voltage pulse across the load and the negative spike, respectively. FIG. 13c shows in an enlarged scale the beginning of a positive half-period with voltage pulses 300 across the load and the corresponding spikes 302, respectively.

We claim:

1. Circuit for controlling the speed of a three-phase motor, comprising:

driving stages connected directly to three-phase mains and connected for passing mains voltage directly to the motor windings under control of a pulse width modulated signal, a control circuit that generates the pulse width modulated signal according to the actual speed of the motor, a power module in each driving stage, comprising a connection of two anti-parallel connected power transistors which are each series-connected with a blocking diode for directly receiving and passing the respective half-period of a mains phase to a motor winding, and an optical coupling circuit between the control circuit and each power transistor, comprising an electrically activable light emitting component connected to the control circuit to have the emitted light modulated by the pulse width modulated signal, and a photo-voltaic light sensitive component connected for receiving the pulse width modulated emitted light to generate a voltage modulated by the pulse width modulated signal, said voltage being applied as a control voltage between the control electrode and the emitter of the respective power transistor, wherein said photo-voltaic light sensitive component generates an output signal in response to received light from said electrically activable light emitting component without any external driving voltage being applied thereto.

2. Circuit according to claim 1, further comprising:

an amplifier stage between the optical coupling circuit and the respective power transistor, which amplifier stage obtains its supply voltage via a further optical coupling circuit of the same kind as the first mentioned optical coupling circuit.

3. Circuit according to claim 1, wherein to enable reversal of the direction of rotation of the motor, two of the motor phase windings are connected each to be supplied from either of the same two mains phases via each of the respective two of the power modules, one for each mains phase, and the third motor phase winding is supplied from the third mains phase via a corresponding power module, the reversal being controlled by a rotation direction signal obtained via a logic circuit.

4. Circuit according to claim 1, wherein the light emitting component is a light emitting diode component, the supply voltage of which being modulated by the pulse width modulated signal, and the light sensitive component is a light sensitive diode component of solar cell type.

5. Circuit according to claim 1, wherein the light emitting and light sensitive components are coupled for light transmission via a fiber optical cable.

6. Circuit according to claim 1, wherein the actual speed of the motor is detected by means of a bar code reader directed towards a bar strip applied around the motor shaft.

7. Circuit according to claim 1, wherein the actual speed of the motor is detected by means of a piezo-electric microphone measuring the pulse width of the frequency emitted by the motor.

8. Circuit for controlling the speed of a three-phase motor, comprising:

driving stages connected directly to mains and connected for passing mains voltage directly to the motor windings under control of a pulse width modulated signal, a control circuit that generates the pulse width modulated signal according to the actual speed of the motor, a power module in each driving stage, comprising a connection of two anti-parallel connected power transistors which are each series-connected with a blocking diode for directly receiving and passing the respective half-period of a mains phase to a motor winding, and an optical coupling circuit between the control circuit and each power transistor, comprising an electrically activable light emitting component connected to the control circuit to have the emitted light modulated by the pulse width modulated signal, and a photo-voltaic light sensitive component connected for receiving the pulse width modulated emitted light to generate a voltage modulated by the pulse width modulated signal, said voltage being applied as a control voltage between the control electrode and the emitter of the respective power transistor, wherein said photo-voltaic light sensitive component generates an output signal in response to received light from said electrically activable light emitting component without any external driving voltage being applied thereto.

9. Circuit according to claim 8, further comprising:

an amplifier stage between the optical coupling circuit and the respective power transistor, which amplifier stage obtains its supply voltage via a further optical coupling circuit of the same kind as the first mentioned optical coupling circuit.

10. Circuit according to claim 8, wherein the light emitting component is a light emitting diode component the supply voltage of which being modulated by the pulse width modulated signal, and the light sensitive component is a light sensitive diode component of solar cell type.

11. Circuit according to claim 8, wherein the light emitting and light sensitive components are coupled for light transmission via a fibre optical cable.

12. Circuit according to claim 8, wherein the actual speed of the motor is detected by means of a bar code reader directed towards a bar strip applied around the motor shaft.

13. Circuit according to claim 8, wherein the actual speed of the motor is detected by means of piezo-electric microphone which measures the pulse width of the frequency emitted by the motor.

14. Switching circuit for a.c. voltage, comprising:

a connection of two anti-parallel connected power transistors which are each series-connected with a blocking diode for directly receiving and passing the respective half-period of the mains voltage to a load, and an optical coupling circuit preceding each power transistor and comprising an electrically activable light emitting component connected to receive a voltage pulse generated by the appearance of the a.c. voltage, and a photo-voltaic light sensitive component connected for receiving a light pulse generated when the voltage pulse is supplied to the light emitting component to generate a corresponding output signal which is applied as opening pulse between the control electrode and the emitter of the respective power transistor, wherein said photo-voltaic light sensitive component generates an output signal in response to received light from said electrically activable light emitting component without any external driving voltage being applied thereto.

15. Circuit according to claim 14, further comprising:

an amplifier stage between the optical coupling circuit and the respective power transistor, which amplifier stage obtains its supply voltage via a further optical coupling circuit of the same kind as the first mentioned coupling circuit.

16. Circuit according to claim 14, wherein wherein the opening pulse is obtained from a capacitor charged via the blocking diodes which capacitor is connected across the light emitting diodes.

17. Circuit according to claim 14, wherein the light emitting component is a light emitting diode component, the supply voltage of which being modulated by the voltage pulse, and the light sensitive component is a light sensitive diode component of solar cell type.

18. Circuit according to claim 14, wherein the light emitting and light sensitive components are coupled for light transmission via a fibre optical cable.

19. Circuit for speed control of a three-phase motor driving a compressor in a refrigeration machine comprising:

driving stages connected directly to three-phase mains and connected for passing mains voltage directly to the motor windings under control of a pulse width modulated signal, a control circuit that generates the pulse width modulated signal according to the actual speed of the motor and the temperature in the inlet and outlet compressor, a power module in each driving stage, comprising a connection of two anti-parallel connected power transistors which are each series-connected with a blocking diode for directly receiving and passing the respective half-period of a mains phase to a motor winding, and an optical coupling circuit between the control circuit and each power transistor, comprising an electrically activable light emitting component connected to the control circuit to have the emitted light modulated by the pulse width modulated signal, and a photo-voltaic light sensitive component connected for receiving the pulse width modulated emitted light to generate a voltage modulated by the pulse width modulated signal, said voltage being applied as a control voltage between the control electrode and the emitter of the respective power transistor, wherein said photo-voltaic light sensitive component generates an output signal in response to received light from said electrically activable light emitting component without any external driving voltage being applied thereto.

20. Circuit according to claim 19, further comprising:

an amplifier stage between the optical coupling circuit and the respective power transistor, which amplifier stage obtains its supply voltage via a further coupling circuit of the same kind as the first mentioned optical coupling circuit.

21. Circuit according to claim 19, wherein the light emitting component is a light emitting diode component, the supply voltage of which being modulated by the pulse width modulated signal, and the light sensitive component is a light sensitive diode component of solar cell type.

22. Circuit according to claim 19, wherein the light emitting and light sensitive components are coupled for light transmission via a fiber optical cable.

23. Circuit according to claim 19, wherein the actual speed of the motor is detected by means of a bar code reader directed towards a bar strip applied around the motor shaft.

24. Circuit according to claim 19, wherein the actual speed of the motor is detected by means of a piezo-electric microphone which measures the pulse width of the frequency emitted by the motor.

25. Circuit for controlling the speed of a three-phase motor driving resistive and inductive loads, comprising:

driving stages connected directly to three-phase mains and connected for passing mains voltage directly to the motor windings under control of a pulse width modulated signal, a control circuit that generates the pulse width modulated signal according to the actual speed of the motor, a power module in each driving stage, comprising a connection of two anti-parallel connected power transistors, which are each series-connected with a blocking diode for directly receiving and passing the respective half-period of a mains phase to a motor winding, and an optical coupling circuit between the control circuit and each power transistor, comprising an electrically activable light emitting component connected to the control circuit to have the emitted light modulated by the pulse width modulated signal, and a photo-voltaic light sensitive component connected for receiving the pulse width modulated emitted light to generate a voltage modulated by the pulse width modulated signal, said voltage being applied as a control voltage between the control electrode and the emitter of the respective power transistor, wherein said photo-voltaic light sensitive component generates an output signal in response to received light from said electrically activable light emitting component without any external driving voltage being applied thereto, and a zero passage detector between each phase and the optical coupling devices of the corresponding power transistors, the output signal of the zero passage detector being supplied together with the pulse width modulated signal to the optical coupling devices via a logic gate to obtain separate control of each optical coupling device and thereby the corresponding half-period of the phase.

26. Circuit for controlling the speed of a three-phase motor, comprising:

driving stages connected directly to three-phase mains and connected for passing mains voltage directly to the motor windings under control of a pulse width modulated signal, a control circuit that generates the pulse width modulated signal according to the actual speed of the motor, a power module in each driving stage, comprising a connection of two anti-parallel connected power transistors which are each series-connected with a blocking diode for directly receiving and passing the respective half-period of a mains phase to a motor winding, and where each power transistor stage comprises a first power transistor forming a voltage output stage, and a second power transistor connected in parallel thereto, forming a current output stage, and an optical coupling circuit between the control circuit and each power transistor, comprising an electrically activable light emitting component connected to the control circuit to have the emitted light modulated by the pulse width modulated signal, and a photo-voltaic light sensitive component connected for receiving the pulse width modulated emitted light to generate a voltage modulated by the pulse width modulated signal, said voltage being applied as a control voltage between the control electrode and the emitter of the respective power transistor, wherein said photo-voltaic light sensitive component generates an output signal in response to received light from said electrically activable light emitting component without any external driving voltage being applied thereto.

27. Circuit for controlling the speed of a three-phase motor, comprising:

driving stages connected directly to three-phase mains and connected for passing mains voltage directly to the motor windings under control of a pulse width modulated signal, a control circuit that generates the pulse width modulated signal according to the actual speed of the motor, a power module in each driving stage, comprising a connection of first and second anti-parallel connected power transistor stages which are each series-connected with a blocking diode for directly receiving and passing the respective half-period of a mains phase to a motor winding, and where the first power transistor stage comprises a power transistor of N-IGBT type, and the second stage comprises a MOSFET transistor driven by a bipolar transistor, the emitter and collector of which being connected to the gate and source, respectively, of the MOSFET transistor, an optical coupling circuit between the control circuit and each power transistor stage, comprising an electrically activable light emitting component connected to the control circuit to have the emitted light modulated by the pulse width modulated signal, and a photo-voltaic light sensitive component connected for receiving the pulse width modulated emitted light to generate a voltage modulated by the pulse width modulated signal, which in the first transistor stage is applied across the emitter-base path of the bipolar transistor, wherein said photo-voltaic light sensitive component generates an output signal in response to received light from said electrically activable light emitting component without any external driving voltage being applied thereto.

28. Circuit for controlling the speed of a three-phase motor, comprising:

driving stages connected directly to three-phase mains and connected for passing mains voltage directly to the motor windings under control of a pulse width modulated signal, a control circuit that generates the pulse width modulated signal according to the actual speed of the motor, a power module in each driving stage, comprising a connection of two anti-parallel connected power transistor stages which are each series-connected with a first blocking diode for directly receiving and passing the respective half-period of a mains phase to a motor winding, and where each power transistor stage comprises a first power transistor and a second power transistor, where the second power transistor in series with a second blocking diode directly connecting to the first blocking diode, is anti-parallel connected with the first power transistor, a charging capacitor connecting to each connection point between said first and second blocking diode, and an optical coupling circuit between the control circuit and each power transistor, comprising an electrically activable light emitting component connected to the control circuit to have the emitted light modulated by the pulse width modulated signal, and a photo-voltaic light sensitive component connected for receiving the pulse width modulated emitted light to generate a voltage modulated by the pulse width modulated signal, said voltage being applied as a control voltage between the control electrode and the emitter of the respective power transistor, wherein said photo-voltaic light sensitive component generates an output signal in response to received light from said electrically activable light emitting component without any external driving voltage being applied thereto.

29. Circuit for controlling the supply of current to a current consuming load supplied by a one-phase or multi-phase mains, comprising:

at least one driving stage connected directly to a mains phase for passing mains voltage directly to the load under control of an opening signal, a control circuit that generates the opening signal according to a control parameter, a power module in the driving stage, comprising a connection of two anti-parallel connected power transistor stages are each series-connected with a blocking diode for directly receiving and passing the respective half-period of a mains voltage to the load and comprise one or a plurality of power transistor functions, and an optical coupling circuit between the control circuit and each power transistor function, comprising an electrically activable light emitting component connected to the control circuit to have the emitted light modulated by the opening signal, and a photo-voltaic light sensitive component connected for receiving the pulse width modulated emitted light to generate a voltage modulated by the opening signal, said voltage being applied as a control voltage for the power transistor functions, wherein said photo-voltaic light sensitive component generates an output signal in response to received light from said electrically activable light emitting component without any external driving voltage being applied thereto.

30. Circuit according to claim 29 for controlling the speed of three-phase motor, wherein:

the at least one driving stage comprises a plurality of driving stages connected directly to three-phase mains for passing mains voltage directly to the motor windings under control of a pulse width modulated signal, the control circuit generates the pulse width modulated signal according to the actual speed of the motor, and the power transistor stages pass the respective half-period of a mains phase to a motor winding, the light emitting component is connected to the control circuit to have the emitted light modulated by the pulse width modulated signal, and the light sensitive component is connected for receiving the pulse width modulated emitted light to generate a voltage modulated by the pulse width modulated signal, said voltage being applied as said control voltage.

31. Circuit according to claim 30, wherein the power transistor functions each comprises a power transistor, the control voltage being applied between the control electrode and the emitter thereof.

32. Circuit according to claim 30, further comprising:

an amplifier stage between the optical coupling circuit and the respective power transistor, said amplifier stage obtaining its supply voltage via a further optical coupling circuit of the same kind as the first mentioned optical coupling circuit.

33. Circuit according to claim 31, wherein to enable reversal of the direction of rotation of the motor, two of the motor phase windings are connected to be supplied each from either of the same two mains phases via each two of the power modules, one for each mains phase, and the third motor phase winding is supplied from the third mains phase via a corresponding power module, the reversal being controlled by a rotation direction signal obtained via a logic circuit.

34. Circuit according to claim 29 for controlling the speed of a one-phase motor, wherein:

the driving stage is connected directly to mains and connected for passing mains voltage directly to the motor winding under control of a pulse width modulated signal, the control circuit generates the pulse width modulated signal according to the actual speed of the motor, the power module comprises a connection of two anti-parallel connected power transistors which are each series-connected with a blocking diode for directly receiving and passing the respective half-period of the mains voltage to the motor winding, the light emitting component is connected to the control circuit to have the emitted light modulated by the pulse width modulated signal, and the light sensitive component is connected for receiving the pulse width modulated emitted light to generate a voltage modulated by the pulse width modulated signal, said voltage being, applied as a control voltage between the control electrode and the emitter of the respective power transistor.

35. Circuit according to claim 34, further comprising:

an amplifier stage between the optical coupling circuit and the respective power transistor, said amplifier stage obtaining its supply voltage via a further optical coupling circuit of the same kind as the first mentioned optical coupling circuit.

36. Circuit according to claim 29, intended as switch for a.c. voltage, further comprising:

the connection comprises two anti-parallel connected power transistors which are each series-connected with a blocking diode for directly receiving and passing the respective half-period of the mains voltage of the load, the light emitting component is connected to receive a voltage pulse generated by the appearance of the a.c. voltage, and the light sensitive component is connected for receiving a light pulse generated when the voltage pulse is supplied to the light emitting component to generate a corresponding output which is applied as an opening pulse between the control electrode and the emitter of the respective power transistor.

37. Circuit according to claim 36, further comprising:

an amplifier stage between the optical coupling circuit and the respective power transistor, which amplifier stage obtains its supply voltage via a further optical coupling circuit of the same kind as the first mentioned optical coupling circuit.

38. Circuit according to claim 37, wherein the opening pulse is obtained from a capacitor charged via the blocking diodes, which capacitor is connected across the light emitting components.

39. Circuit according to claim 30 for controlling the speed of a three-phase motor driving a compressor in a refrigerating machine, wherein the control circuit generates the pulse width modulated signal according to the temperature in the inlet and outlet of the compressor.

40. Circuit according to claim 30, further comprising:

a zero passage detector between each phase and the optical coupling devices of the corresponding power transistors, the output signal of said zero passage detector being supplied together with the pulse width modulated signal to the optical coupling devices via a logic gate to obtain separate control of each optical coupling device and, thereby, the corresponding half-period of the phase.

41. Circuit according to claim 29, wherein each power transistor stage comprises a first power transistor forming a voltage output stage, and a second power transistor connected in parallel thereto forming a current output stage.

42. Circuit according to claim 29, wherein the first power transistor stage comprises a power transistor of N-IGBT type and the second stage comprises a MOSFET transistor driven by a bipolar transistor, the emitter and collector of which are connected to the gate and the source respectively of the MOSFET transistor, and that the control voltage of the first transistor stage is applied between the control electrode of the IGBT-transistor and the base of the bipolar transistor and of the second transistor stage across the emitter-base path of the bipolar transistor.

43. Circuit according to claim 29, wherein each power transistor stage comprises a first power transistor and a second power transistor, where the second power transistor in series with a second blocking diode directly connecting to the first blocking diode, is anti-parallel connected with the first power transistor, a charging capacitor connecting to each connection point between said first and second blocking diode.

44. Circuit according to claim 1, further comprising:

a light-proof housing surrounding said electrically activable light emitting component and said photo-voltaic light sensitive component.

* * * * *